(12) United States Patent
Beljean et al.

(10) Patent No.: US 12,102,054 B2
(45) Date of Patent: Oct. 1, 2024

(54) FLEXIBLE STALL DIVIDER

(71) Applicant: SPEED FRANCE SAS, Arnas (FR)

(72) Inventors: Yann Beljean, Arnas (FR); Pierre Fialon, Gleize (FR)

(73) Assignee: SPEED FRANCE SAS, Arnas (FR)

( * ) Notice: Subject to any disclaimer, the term of this patent is extended or adjusted under 35 U.S.C. 154(b) by 0 days.

(21) Appl. No.: 18/267,945

(22) PCT Filed: Oct. 4, 2021

(86) PCT No.: PCT/EP2021/077293
§ 371 (c)(1),
(2) Date: Jun. 16, 2023

(87) PCT Pub. No.: WO2022/135759
PCT Pub. Date: Jun. 30, 2022

(65) Prior Publication Data
US 2024/0065221 A1    Feb. 29, 2024

(30) Foreign Application Priority Data

Dec. 21, 2020  (EP) ..................................... 20306638

(51) Int. Cl.
*A01K 1/00*  (2006.01)
(52) U.S. Cl.
CPC ................................. *A01K 1/0011* (2013.01)
(58) Field of Classification Search
CPC ............................ A01K 1/0011; B29C 53/582
See application file for complete search history.

(56) References Cited

U.S. PATENT DOCUMENTS

2007/0044991 A1   3/2007  Varkey
2018/0184613 A1*  7/2018  Zartman ............... B29C 53/083

FOREIGN PATENT DOCUMENTS

FR       2621345 A1   4/1989
WO    2009052829 A1   4/2009

OTHER PUBLICATIONS

PCT Search Report in related, co-pending PCT Application No. PCT/EP2021/077293 mailed Jul. 2, 2022.
European Search Report in related, co-pending EP Application No. 20 30 6638, mailed Jun. 1, 2021.

* cited by examiner

*Primary Examiner* — Kristen C Hayes
(74) *Attorney, Agent, or Firm* — Thomas | Horstemeyer, LLP

(57) ABSTRACT

The invention relates to a stall divider (1) having the general shape of a "U", comprising parallel wings (10, 11) which extend to form a curved base (12), with a region (120) in which the distance between said wings (10, 11) is reduced, the free ends of said wings (10, 11) being engaged in sleeves (13), themselves attached to a plate (14), for fixing the divider (1) to a fixed structure, characterized in that It consists of a bent cable with a shape memory that includes: —a core (2) formed by a central filament (20), of longitudinal direction, which is surrounded by a set of additional filaments (21), also of longitudinal direction, these additional filaments (21) being wound helically around the central filament (20); —a monobloc envelope (3) for the protection of the said core (2), this core (2) and envelope (3) being at least partially polymer-based.

16 Claims, 2 Drawing Sheets

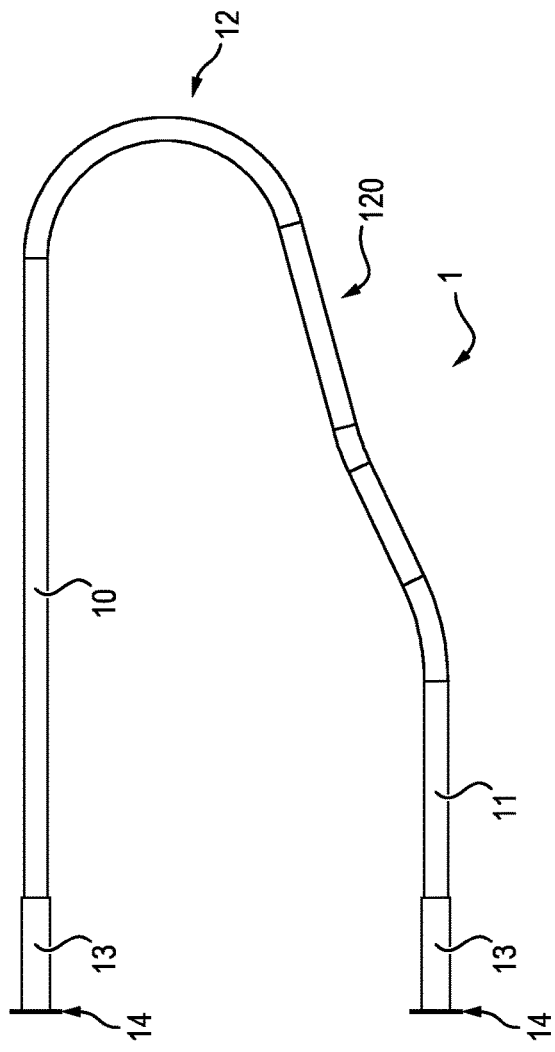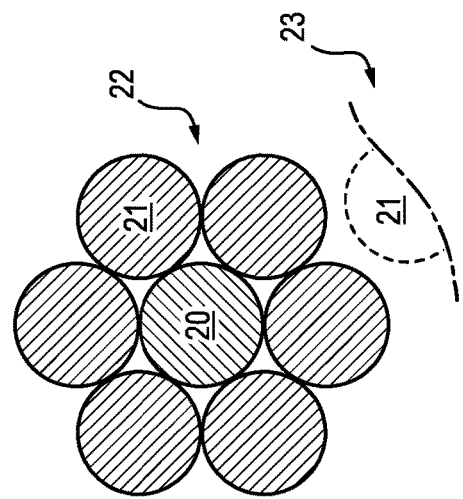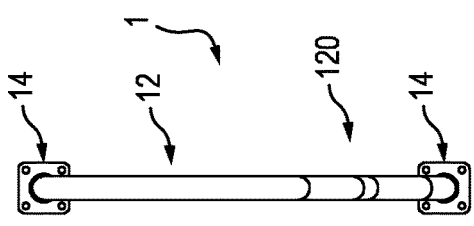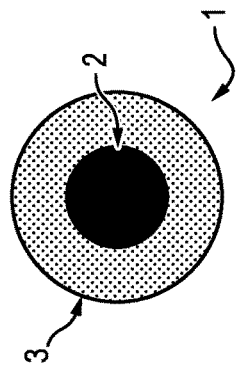

FLEXIBLE STALL DIVIDER

CROSS REFERENCE TO RELATED APPLICATIONS

This application is the 35 U.S.C. § 371 national stage application of PCT Application No. PCT/EP2021/077293, filed Oct. 4, 2021, which application claims the benefit of European Application No. EP 20306638.6 filed Dec. 21, 2020, both of which are hereby incorporated by reference herein in their entireties.

FIELD OF THE INVENTION

The present invention belongs to the general field of livestock equipment. It concerns more specifically a flexible stall divider.

BACKGROUND OF THE INVENTION

Stall dividers (also called cubicles) are well known and used in cattle barns to separate a large space into a plurality of individual spaces. In these individual spaces, the animals park, rest and ingest fodder.

As shown schematically in FIG. 1, each individual space S is delimited laterally by two stall dividers 1 and in depth by a low wall, a barrier or a similar device 2.

An entrance E allows the animal A to enter and exit the space.

Stall dividers 1 have the general shape of a "U" with parallel wings extending horizontally, the base of the "U" having a curved shape so as not to injure the animal when it enters the stall.

They are generally made of galvanized steel, for reasons of rigidity and shock resistance.

As shown in FIG. 1, when animal A is standing, there is a significant gap between its flanks and the dividers 1.

On the other hand, when animal A lies down, it is common for one of its flanks and/or part of its hindquarters to hit one of the dividers. This situation is illustrated in FIG. 2.

It is easy to understand that this can cause injuries to the animal.

A stall divider is for example described in US2018/0184613.

SUMMARY OF THE INVENTION

Thus, there is a need to propose a stall divider that performs the same functions as known separators, but without the risk of injury to the animal, especially when it lies down.

To that end, the invention provides a stall divider having the general shape of a "U", comprising parallel wings which extend to form a curved base, with a region in which the distance between said wings is reduced, the free ends of said wings being engaged in sleeves, themselves attached to a plate, for fixing the divider to a fixed structure, characterized in that It consists of a bent cable with a shape memory that includes:
- a core formed by a central filament, of longitudinal direction, which is surrounded by a set of additional filaments, also of longitudinal direction, these additional filaments being wound helically around the central filament;
- a monobloc envelope for the protection of the said core, this core and envelope being at least partially polymer-based.

In some preferred but optional embodiments, which may be combined if appropriate:
- said additional filaments are arranged in concentric cercles;
- the filaments of two adjacent concentric circles are helically wound in opposite directions;
- the size of the filaments increases as one moves away from the core;
- said filaments are made of polyester;
- the central filament is made of metal while the additional filaments are made of polyamide;
- said monobloc envelope comprises polyamide;
- said monobloc envelope comprises polyamide 6 and/o at least one of its copolymers.
- said envelope incorporates a filler that imparts roughness to its surface;
- said envelope is coated with a silicone surface coating;
- its total length, comprised between said plate and said curves base, is comprised between 1000 and 2500 mm and preferably between 1306 and 2260 mm;
- its height, i.e. the distance between the axis of its parallel wings is comprised between 500 and 1000 mm and preferably between 650 and 850 mm.

BRIEF DESCRIPTION OF THE FIGURES

Additional features and advantages of the invention will appear in the following detailed description of embodiments, based on the appended drawings, wherein:

FIG. 4 is a front view of the divider of FIG. 3;

FIG. 5 is a side view of the divider of FIG. 3;

FIG. 6 is a cross-sectional view of the divider of FIG. 3.

FIG. 7 is a diagram which illustrates the arrangement of monofilaments inside the core of the divider.

DETAILED DESCRIPTION OF EMBODIMENTS OF THE INVENTION

Figure 1:
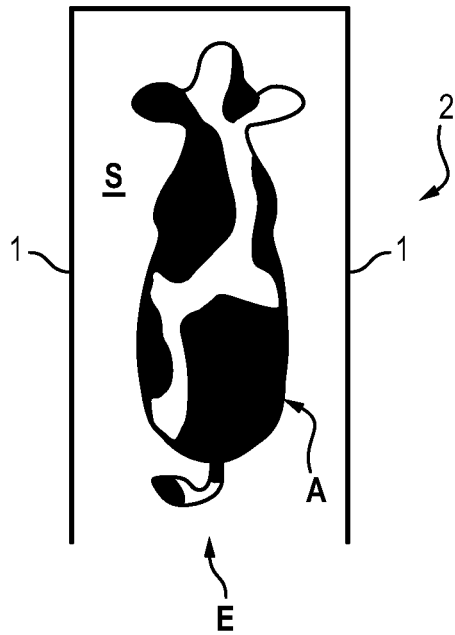
FIG. 1 is a diagram showing an animal in place in a space bounded by two stall dividers, with the animal shown standing.
Figure 2:
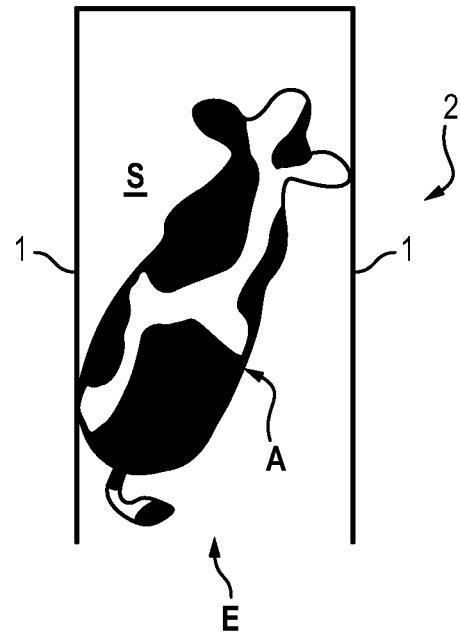
FIG. 2 is a diagram similar to FIG. 1, showing an animal lying down.
Figure 3:
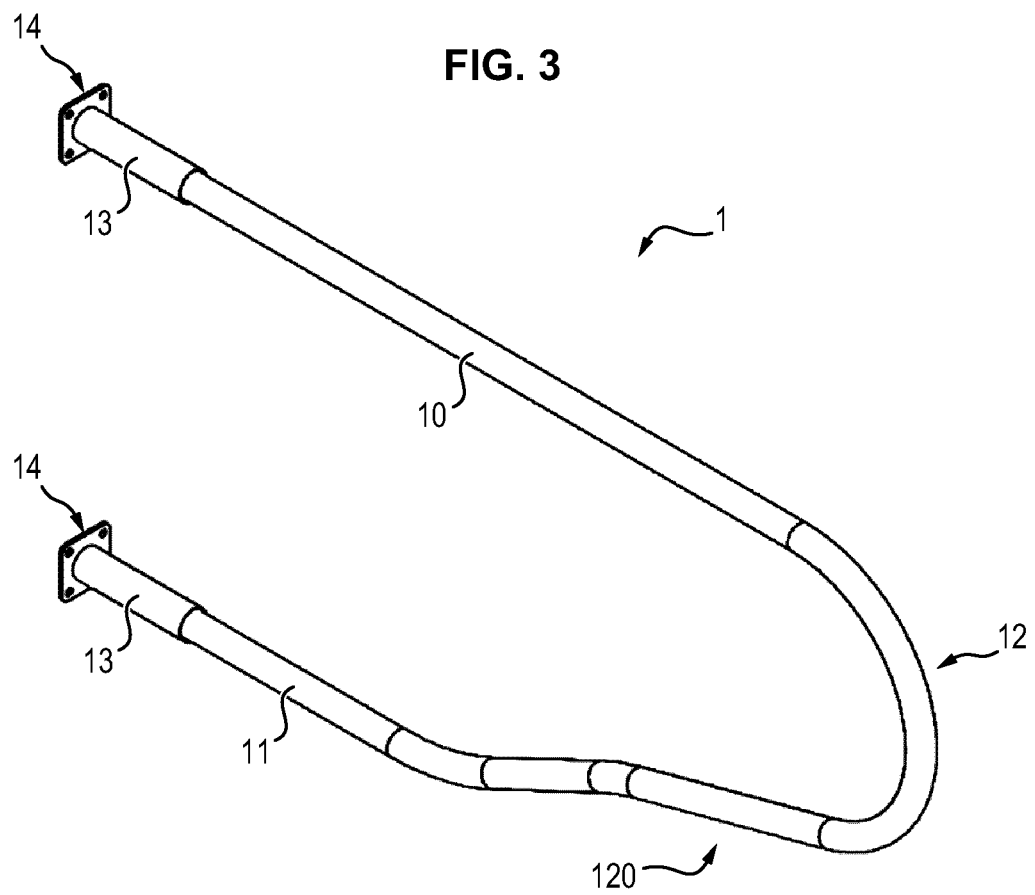
FIG. 3 is a perspective view of a stall divider according to the invention.

As shown in FIGS. 3 to 5, the stall divider 1 of the invention has an appearance very similar to that of known dividers.

It consists of a cable which is bent and has the general of a "U" with parallel wings 10 and 11 extend to form a curved base 12 with a region 120 in which the distance between wings 10 and 11 is reduced. This region allows the animals to move quietly and easily from standing to lying down (and vice versa).

Free ends of wings 10 and 11 are engaged in cylindrical metal sleeves 13, themselves attached to a plate 14, for fixing the divider 1 to a fixed structure such as a low wall (not shown).

FIGS. 6 and 7 help to understand the structure of the divider 1.

Contrary to the dividers of the previous art, the divider 1 of the present invention comprises a core 2 and a monobloc envelope 3 for the protection of said core 2, this core 2 and this envelope 3 being at least partially polymer based.

According to the present invention, said core 2 is formed by a central filament 20, of longitudinal direction, which is surrounded by a set of additional filaments 21, also of longitudinal direction, these additional filaments 21 being wound helically around the central filament.

In FIG. 7, only a subset 22 of filaments 21 is shown.

Nevertheless, in a preferred embodiment, additional subsets 23 of filaments 21 can be added. These are placed at the periphery of subset 22, according to a concentric circle arrangement, so that they significantly increase the diameter of the cable.

For example, a cable according to the present invention comprises a central filament 20, a first subset 22 and four additional concentric subsets 23 of filaments 21.

Preferably, the size of the filaments 21 increases as one moves away from the central filament 20.

For example, considering that the filaments have a circular cross-section, their diameter varies between 1 and 3.5 millimeters.

In an embodiment, the core may comprise around 60 individual filaments.

In a preferred embodiment, said filaments are made of polyester.

After winding the filaments 21 around the central filament 20, using a turntable, the assembly undergoes a heat treatment to ensure the fixation of the filaments 20 and 21 between them.

According to FIG. 7, filaments have a circular cross section. But they can have a different cross-section, for example an approximately squared cross-section.

Thanks to this arrangement, the cohesion of the core 2 is great while allowing a deformation on the whole of its length, because of the individual filaments. In addition, such a core has a particularly high resistance to rupture. Consequently, said core has a great elasticity, is deformable and has a shape memory behavior.

When at least at least two subsets of additional filaments are present, two adjacent concentric circles of said filaments are helically wound in opposite directions. More precisely, the first one is wound helically clockwise and the next one counter-clockwise. This feature gives a particularly good cohesion to the divider, while ensuring a good deformation.

According to a variant, the central filament 20 may be made of metal while the additional filaments 21 are made of polyester.

According to another variant, some of said additional filaments are made of polymer while the others are made of metal.

The monobloc envelope 3 preferably comprises polyamide, and more preferably polyamide 6 and/or at least one of its copolymers. This gives rigidity and resistance to said envelope 3.

Preferably, the thickness of said envelope is between 20 and 80 mm and more preferably between 30 and 50 mm.

It is also possible to introduce in polyamide a dye and/or a filler, for example for imparting to the surface the divider a certain roughness. Such a roughness is appreciated by the animals which like to rub against the divider 1.

Some examples of said fillers are the followings: large-sized natural fibers (cellulose, hemp, etc.), Mineral particles (silica, $TiO_2$, etc.).

In a totally different embodiment, the envelope 3 is coated with a silicone surface coating in order to obtain a very smooth surface. Thanks to this coating, the animals' droppings do not adhere to the divider 1.

In order to place said envelope 3 around said core 2, it is possible to introduce said core 2 into at least a covering extruder.

In order to obtain the divider according to the invention, the cable undergoes a forming process in order to give it a shape memory.

For example, at the end of this manufacture process, the product has the shape of a straight bar; It is then cut at the desired length and shaped by a mechanical action as soon as possible to avoid cooling.

Once the shaping is complete, a controlled cooling process is carried out.

Finally, metal sleeves 13 with their plate 14 are attached to the cable in order to obtain the stall divider 1.

The diameter of the cable may be adapted according to the size of the divider. Its length depends on the breed of the animals. It can be for example 1.9, 2.2, or 1.7 meters long. When the divider is used only as feeder divider, its length will be preferably 1.3 meters.

The dividers according to the invention are:
Smooth and flexible: cows do not get hurt whenever they lie down, stand up or just lean on the divider.
Resistant: They have a high breaking load.
Supple enough to provide a maximum comfort to the cow, rigid enough to contain the cow in the stall.
More precisely, they give the following benefits:
Flexible and elegant;
Easy and fast to install;
Lighter than steel, smoother surface;
More ergonomic shape than galvanized stall dividers and highly resistant;
Shape memory return.
Less injuries, i.e.:
Short term: no more physical damage or stress from hitting metal dividers. The decrease in stress causes an increase in the quantity of milk produced, and in the quality of this milk.
Long term: no more injures of joints from prolonged standing and the subsequent risk of infections.

In the table below are listed some dimensional characteristics of five dividers according to the invention, which have the shape shown in FIG. 3

| Divider Reference | Total length (mm) | Tolerance (+/− mm) | Diameter (mm) | Tolerance (+/− mm) | Height (mm) | Tolerance (+/− mm) |
|---|---|---|---|---|---|---|
| 1 | 1306 | 100 | 44 | 10 | 650 | 100 |
| 2 | 1506 | 100 | 44 | 10 | 650 | 100 |
| 3 | 1706 | 100 | 50 | 10 | 850 | 100 |
| 4 | 1906 | 100 | 50 | 10 | 850 | 100 |
| 5 | 2106 | 100 | 50 | 10 | 850 | 100 |

In this table, the terms below have the meanings given immediately after them.
Total length: length between the plate 14 and the end of curved base 12;
Diameter: diameter of the divider;
Height: distance between the axis of parallel wings 10 and 11.

These dimensions are related to the technical constraints of forming the separator.

The diameter of the separator increases when its length increases as well.

The invention claimed is:

1. Stall divider having the general shape of a "U", comprising parallel wings which extend to form together a curved base, the curved base having a region in which the distance between the parallel wings is reduced, the free ends of said parallel wings being engaged in sleeves, the sleeves being attached to a plate for fixing the stall divider to a fixed structure,
wherein said stall divider comprises a bent cable with a shape memory that includes:
a core formed by a central filament, of longitudinal direction, which is surrounded by a set of additional filaments, also of longitudinal direction, the additional filaments being wound helically around the central filament;
a monobloc envelope for the protection of the the core, the core and the monobloc envelope being at least partially polymer-based.

2. Stall divider according to claim 1, wherein said additional filaments are arranged in concentric cercles.

3. Stall divider according to claim 2, wherein the additional filaments of two adjacent concentric circles are helically wound in opposite directions.

4. Stall divider according to claim 2, wherein the size of the additional filaments increases as one moves away from the core.

5. Stall divider according to claim 1, wherein said central filament and additional filaments are made of polyester.

6. Stall divider according to claim 1, wherein the central filament is made of metal while the additional filaments are made of polyamide.

7. Stall divider according to claim 1, wherein said monobloc envelope comprises polyamide.

8. Stall divider according to claim 7, wherein said monobloc envelope comprises polyamide 6 and/or at least one of its copolymers.

9. Stall divider according to claim 8, wherein said monobloc envelope incorporates a filler that imparts roughness to its surface.

10. Stall divider according to claim 8, wherein said monobloc envelope is coated with a silicone surface coating.

11. Stall divider according to claim 7, wherein said monobloc envelope incorporates a filler that imparts roughness to its surface.

12. Stall divider according to claim 7, wherein said monobloc envelope is coated with a silicone surface coating.

13. Stall divider according to claim 1, wherein its total length comprised between said plate and said curved base, is comprised between 1000 and 2500 mm.

14. Stall divider according to claim 1, wherein the distance between the axis of its parallel wings is comprised between 500 and 1000 mm.

15. Stall divider according to claim 1, wherein the distance between the axis of its parallel wings is comprised between 650 and 850 mm.

16. Stall divider according to claim 1, wherein its total length comprised between said plate and said curved bas, is comprised between 1306 and 2260 mm.

* * * * *